Sept. 19, 1967  F. W. WANZENBERG  3,342,638
PROCESS AND APPARATUS FOR SEPARATION AND RECOVERY OF
INSULATION MATERIALS AND METALS
Filed Oct. 25, 1963  4 Sheets-Sheet 3

Sept. 19, 1967                F. W. WANZENBERG                3,342,638
           PROCESS AND APPARATUS FOR SEPARATION AND RECOVERY OF
                    INSULATION MATERIALS AND METALS
Filed Oct. 25, 1963                                4 Sheets-Sheet 4

3,342,638
PROCESS AND APPARATUS FOR SEPARATION AND RECOVERY OF INSULATION MATERIALS AND METALS
Fritz W. Wanzenberg, 9 Campbell Lane, Larchmont, N.Y. 10538
Filed Oct. 25, 1963, Ser. No. 318,847
30 Claims. (Cl. 134—9)

This invention relates to separation of the insulating component and the metallic component from compositions wherein the two are physically combined. More particularly, the present invention relates to a method and apparatus for separating and recovering non-conducting materials and metals from normally adhering physical combinations thereof such as occur in insulated wire.

One common method of separation involves combustion of insulation surrounding wire to provide for the recovery of the wire component. This conventional process has serious practical limitations. For example, marked air pollution occurs as a result of burning and incinerating the insulation. The insulation, which is often costly, is also lost.

Another, but more involved, procedure includes a pulverization of insulated wire in a hammer mill preparatory to recovery of the metal component and loss of the insulation material due again to combustion or the like.

The former methods result in corrosion of the processing apparatus caused by agents such as chlorine and fluorine released from the insulating resins and plastics in which they are contained. In both methods significant losses in the amounts of the metal recovered are known to occur.

It is an object of this invention to provide a process and apparatus which overcome these and other disadvantages and which effect separation and permit recovery of both insulation and metal components in a state of high purity from a material or article in which they occur in physically combined form.

Other objects and advantages of the invention will be explained or will be apparent from the following description thereof in connection with the accompanying drawings, in which.

The invention is accordingly directed to an apparatus 10 and a process for treating a mass of nonconducting material and metal 11 in physical combination, and particularly insulated wire, to separate and recover the individual components.

The process comprises heating the mass 11 to a temperature sufficient to soften without burning the nonconducting or insulation component 12 and compressing the heated mass 11 to extrude the insulation 12 therefrom while compressing the metal into a solid mass or compact 17.

The apparatus for separating insulation and metal from physical, usually adhering, combinations thereof in accordance with the invention comprises generally a female die 14 having a chamber 16 in which is defined an entry end 18 of expanded cross-sectional area and an opposite constricted end 19 of reduced cross-sectional area; a ram 22 adapted for insertion through said entry end 18 to compress an insulated mass disposed therein; means defining an orifice 23 in the constricted end 19 of said die chamber 16 for facilitating removal of metal therefrom; and means for extruding said insulation 12 about said ram 22 in a direction opposed to that of the ram when it is inserted within said die chamber and exerting pressure on said insulated metal mass disposed therein. Means are also provided in the preferred embodiments of the invention for heating the foregoing mass and abstracting a portion thereof for compression within the die chamber 16.

Figures 1, 2:
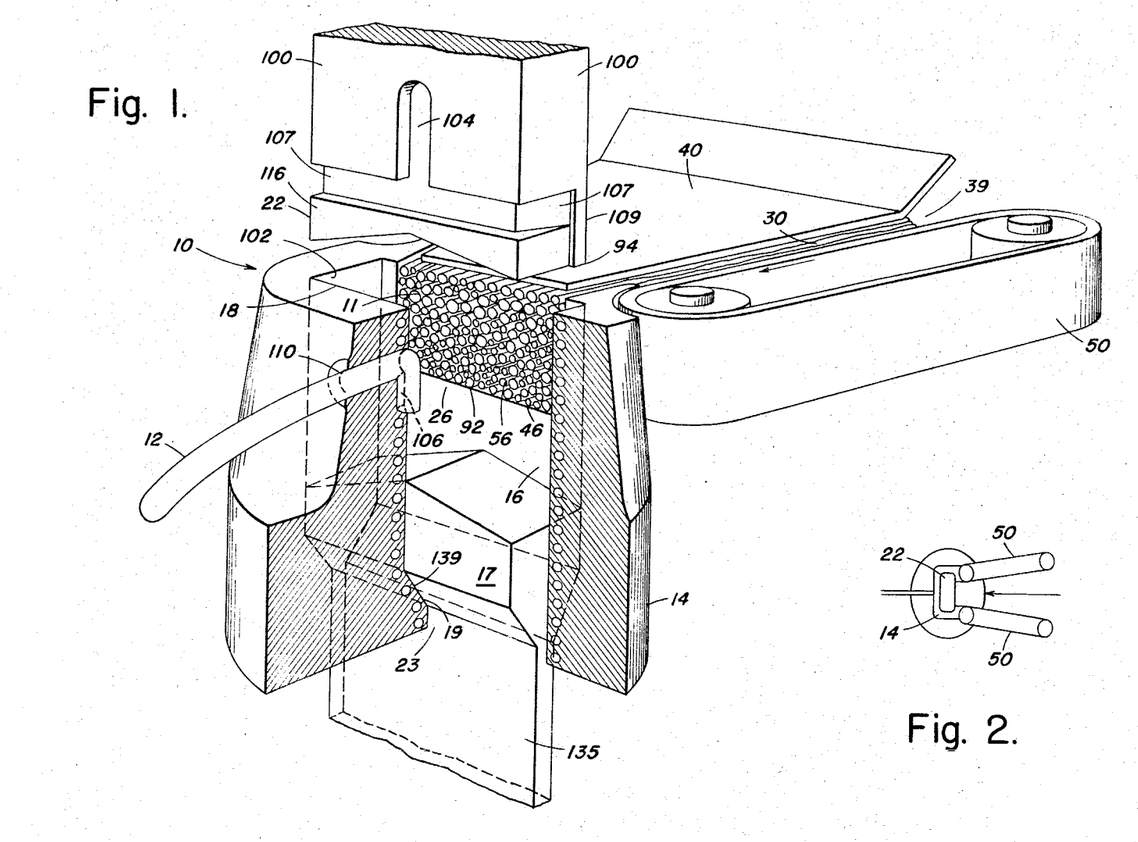
FIGURE 1 is an isometric partially schematic view of apparatus according to the invention partly in section with portions broken away showing insulated wire being fed into the apparatus and insulation and metal extruded separately therefrom.
FIGURE 2 is a schematic plan view of the apparatus shown in FIGURE 1.

An insulated wire feed mass 11, for example, is assembled in the feed container 30 which, as seen in FIGURE 1, is formed by the stationary cover 40, the container floor 46 and the feed conveyor belts 50 positioned along the opposite sides of the container 30. The conveyor belts are adapted to move the insulated wire mass 11 from the entry end 39 of the container 30 through the feed port 56 at the opposite end of the container and into the die 14; the insulated wire mass 11 passing into the die chamber 16 adjacent its expanded end 26. The belts 50 come into closest proximity to one another at their termination adjacent the feed port 56 effecting in this way a lateral contraction in the dimensions of the container 30 which serves to compress and collect the wire mass 11 prior to its entry into the die chamber 16.

Figures 3, 4:
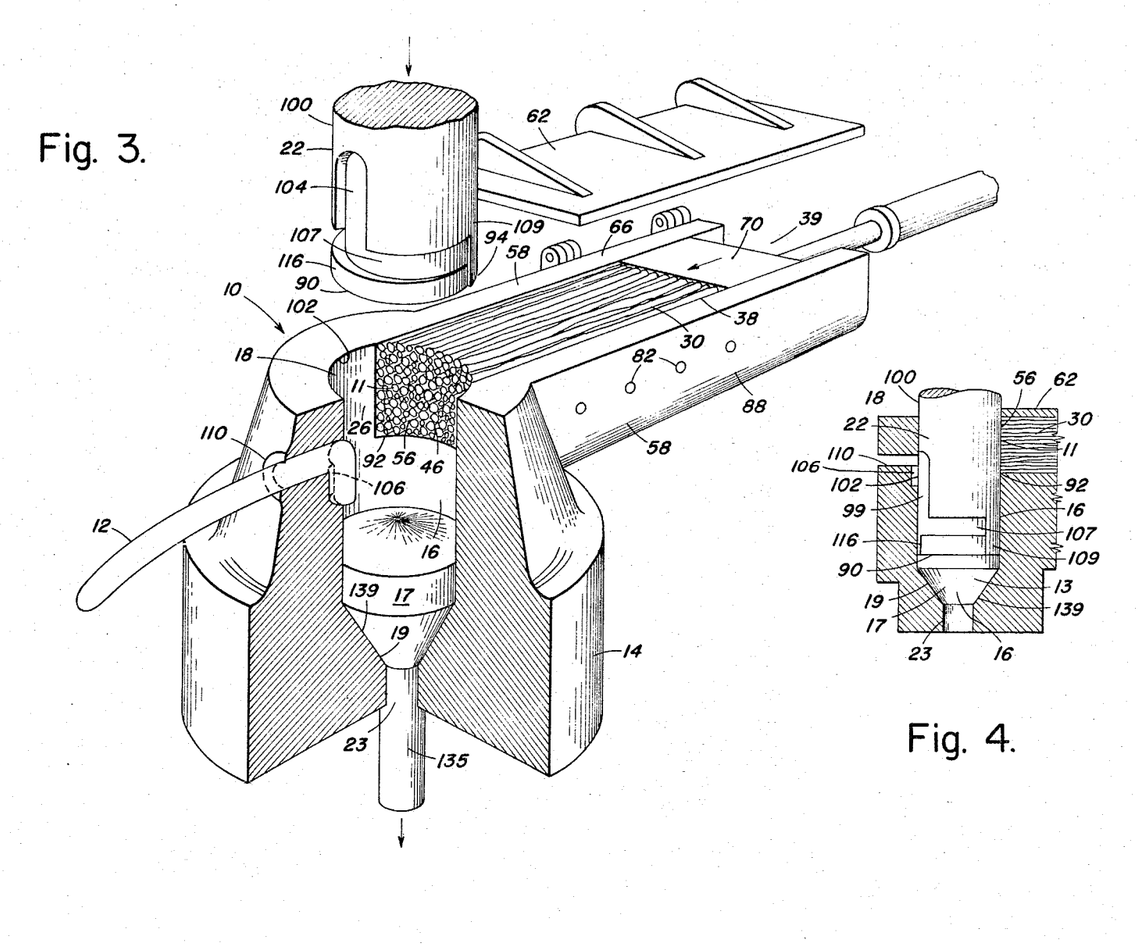
FIGURE 3 is an isometric, partially exploded and schematic view of another embodiment of the invention, partially in section, as well, with portions broken away, showing insulated wire feed, extruded insulation and partially extruded metal components therein.
FIGURE 4 is a view partially in section and partially elevational of the apparatus of FIGURE 3.

As seen in FIGURE 3 the feed container 30 has side walls 58 rather than the feed belts 50 and a cover 62 hingedly connected to the upper margin 66 of one of the side walls 58 permitting ready access to the interior of the gathering container 30.

The function of the feed belts 50 of the embodiment shown in FIGURE 1 is replaced by the hydraulic feed ram 70 which in the retracted position provides the entry end 39 for introduction of insulated wire 11 into the container 30. The ram 70, suitably mounted in standard manner, when actuated forces the charge of insulated wire feed 11 through the feed port 56 into the upper and wider end 18 of the die chamber 16, after which the ram is withdrawn to its retracted position adjacent the end 39 of the container 30. The lateral margins of the ram 70 are in fitted and slideable engagement with the container cover 62, the floor 46 and the side walls 58 to prevent escape of insulated wire 11 about the head of the ram 70. A hopper (not shown) may be arranged to feed insulated wire into the container 30 through the entry end 39.

Figures 7, 8:
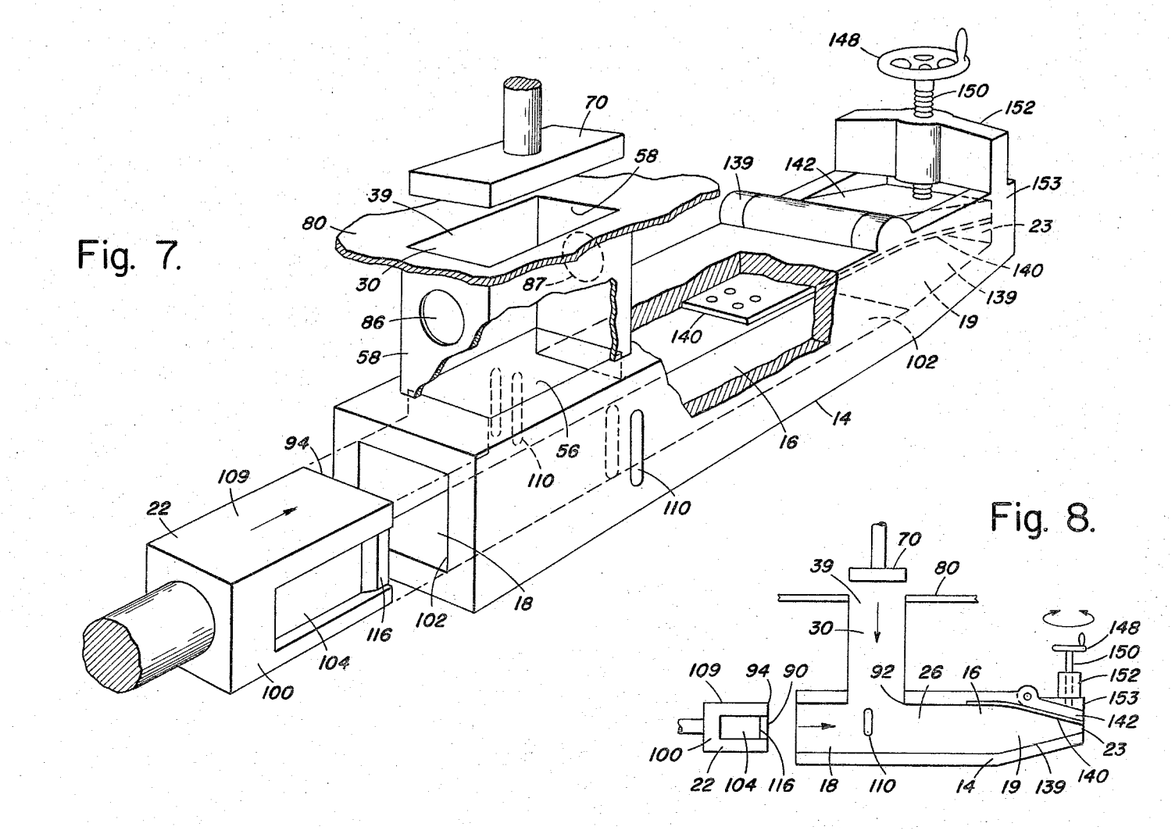
FIGURE 7 is an isometric view of another embodiment of apparatus according to the invention with portions broken away.
FIGURE 8 is a schematic view in longitudinal section of the apparatus shown in FIGURE 7.

In the embodiment of FIGURES 7 and 8 the insulated wire which is normally scrap or rejected material, is simply pushed along the feed floor 80 into the feed container 30 which is disposed vertically above the press or die chamber 16. In this instance the feed ram 70 moves in a substantially vertical manner from its retracted position above the feed floor 80 down into the entry end 39 of the feed container 30 pressing the insulated wire (not shown) before it into the press or die 14 through the port 56.

Means for heating the insulated wire within the feed container 30 are readily provided in each of the aforesaid embodiments. Superheated steam is, for example, injected into the container 30 through the orifices 82 arranged in the side walls 58 in the embodiment of FIGURE 3. Similar heating means can be provided between the container cover 40 and the belts 50 in the embodiment of FIGURE 1.

As shown in FIGURE 7, hot air can be conducted into the chamber 30 from a furnace (not shown) by means of the entry aperture 86 and removed from the chamber at least in part through the exit aperture 87. The aperture 87 can be disposed at a higher level in the container 30 than the entry aperture 86 to facilitate removal of the air circulated to the container 30 which will tend to rise in its passage across the container. Alternatively, heating coils (not shown) can be recessed in the container walls 58 or superheated steam ejected through orifices (not shown) defined therein in a manner similar to that described in FIGURE 3.

Standard heating means such as those just described can likewise be disposed in and about the die 14. Illustratively, heating coil 89 can be embedded in the metallic die 14 as shown in FIGURE 1. This course is followed usually only where preheating of the mass 11 is not undertaken in the feed container 30. Otherwise the heat engendered by the friction and pressure occurring within the die chamber 16 during the compression stroke of the ram 22 is sufficient to raise the temperature of the insulated metal mass above the softening point of the insulation component.

When insulated wire 11, collected or baled in the gathering or feed container 30, is moved forward through the feed port 56 into the upper end 26 of the die chamber 16, the die extrusion ram 22 is in a retracted position to provide an unobstructed entry for insulated metal or wire 11. Peferably and as seen in the accompanying drawings the die extrusion ram has a shear edge 94 which facilitates severance of the mass of insulated metal forced into the die chamber 16 from that remaining in the feed container 30. The insulated metal or wire as shown illustratively in the drawings is propelled into the expanded entry end 18 of the die chamber 16 by suitable feed propulsion means. Illustrative of such propulsion means are the belts 50 of FIGURE 1 and the hydraulic feed ram 70 of FIGURES 3 and 7 described above.

The border of the feed port 56 disposed generally parallel to the face 90 of the die extrusion ram and shear 22 and remote therefrom when the ram is in its retracted position is constructed to provide a stationary shearing edge 92 which cooperates with the mobile ram shearing edge 94 disposed on and comprising the margin of the ram face 90 adjacent the feed port 56. The ram face 90 can be flat, curved, angular, serrated or otherwise defined. A mildly concave surface is normally preferred. The shearing edges 92 and 94 sever that portion of the insulated wire 11 extending into the expanded end 18 of the die chamber 16. The ram face 90 compresses the severed and heated insulated wire to form a metal compact 13 from which the insulation 12 is extruded by the impressment of the ram 22. The insulation 12 is forced outwardly from the compacted mass in the die chamber 16 in a direction substantially opposed to that of the ram 22 in its compression stroke within the die chamber 16. The cross-sectional area of the die chamber 16 is substantially uniform along that portion of its length through which the ram and shear 22 pass during the compression stroke. At, or as in the accompanying drawings, adjacent the limit of the ram's compression stroke the cross-sectional area of the die chamber starts to converge toward its constricted end 19 which is continuous with the orifice 23.

The relatively low viscosity insulation component containing, for example, solid components such as rubber and neoprene, is extruded from the evolving metal compact in the direction of least resistance about the ram 22 into the insulation colecting duct 99 shown in FIGURE 4. The less viscous metallic component is compressed in the direction of the compression stroke of the ram 22.

Extrusion of the insulation material 12 which has been rendered viscous by preheating ordinarily in the container 30 and by the pressure applied thereafter in the die chamber 16 is accomplished through the constricted insulation collecting duct 99 shown in FIGURE 4.

This duct is formed in certain embodiments by channels or indentations, shown for example in FIGURES 1, 3, 4 and 5, arranged in the side walls 100 and 102 of the ram 22 and die chamber 16 respectively. The side walls 100 and 102 are in substantially frictional and slideable engagement during a substantial portion of the impressment or compression stroke of the ram 22. The indentation in the ram surface or side wall 100 constitutes the ram collecting channel 104. The corresponding indentation in the interior die surface on wall 102 defines the die collecting channel 106. These channels 104 and 106 complement each other at the end of the compression phase of the ram stroke 22 to form the enclosed passage, or insulation collectnig duct 99, shown in FIGURE 4.

The die collecting channel 106 terminates at one end, that end more nearly adjacent the expanded end 18 of the die chamber 16, in the insulation collecting orifice 110 which defines a passage through the die 14 along the course of the expanded end 18 of the die chamber. The ram collecting channel 104 terminates in like manner at its corresponding end in such a manner as to encompass the inner end of the collecting orifice 110.

The complementary portions of the channels 104 and 106 are disposed lengthwise along the direction of movement of the ram 22 within the die 14. The end of the die collecting channel 106 remote from the collecting orifice 110 terminates adjacent to but short of the ram face 90 when the ram 22 is at the end of its compression stroke. The corresponding end of the ram collecting channel 104 follows a similar course but normally extends nearer to the ram face 90 and diverges laterally at this point to form the divergent or arcuate branches 107 terminating adjacent to the shear side wall 109 of the ram 22 as shown in the accompanying drawings.

As will be apparent from the drawings, the ram surface 100 and the corresponding interior 102 of the die chamber 16 can assume a variety of cross-sectional configurations, such as the quadrilateral or rectangular conformation of FIGURES 1 and 7 or the annular or circular conformation of FIGURES 3, 4, 5, and 6, for example.

Disposed between the arcuate branches 107 of the channel 104 and the face 90 of the ram is the raised margin 16 which is however recessed from the lateral limits of the side walls 100 and is in spaced relation to the side walls 102 of the die chamber 16 when the ram 22 is moving through the die chamber 16. The space provided in this manner defines a passage or clearance between the die chamber below the face 90 of the ram 22, when the latter is disposed within the die chamber, and the die collecting channels 104 and 106 forming the insulation collecting duct 99. It is about this margin 116 that the compressed insulation defines a passage into the arcuate branches 107 and the main duct 99 and thence into the insulation orifice or vent 110. The clearance about the margin 116 is normally very limited. Where, for example, a ram 22 has a diameter of three inches, a clearance of thirty thousandths of an inch is considered desirable.

In any case, the modified margin 116 and ram collecting channel 104 can extend, if desired, to a point adjacent but not beyond the lateral limits of the shearing edges 92 and 94 and the feed port 56. In this way the shear side wall surface 109 of the ram 22 adjacent the mobile ram shearing edge 94 and opposite the container feed port 56 serves as a closure for the latter and prevents further insulated wire or other metal from passing from the gathering or feed container 30 into the die chamber 16 when the ram 22 is compressing an insulated metal feed mass in the die chamber 16.

The structure and shape of the ram and die collecting channels 104 and 106 and the resulting insulation collecting duct 99 are subject to a variety of modifications. Thus, the arcuate branches 107 are not usually employed in equipment where the cross-sectional area of the ram 22 and the die chamber 16 are comparatively small. Illustratively, too, in FIGURES 7 and 8, the notches forming the insulation collecting ducts are defined exclusively by the ram collecting channels 104, no complementary die collecting channels being provided in the interior walls 102 of the die chamber 16. The insulation collecting duct can also be defined as a die collecting channel 106 alone, if desired, however.

Thus, like channels 104 are disposed in the embodiment of FIGURE 7 and 8 on the opposed parallel side walls 100 of the die extension ram 22 adjacent the shear side wall 109, although only one such channel is seen. Each channel 104 has a substantially rectangular conformation. When the ram 22 is compressed within the die 14 these channels 104 form with the interior unmodified walls 102 of the die 14 the insulation collecting ducts (not shown) which communicate with corresponding insulation collecting orifices 110.

While the foregoing system of channels, duct and orifice for extrusion and recovery of the insulation material is preferred, it is also possible though significantly less desirable to simply use a ram face 90 of slightly smaller cross-sectional area than that of the die chamber 16. In this case the insulation is expressed about the lateral margins of the ram face 90 through the clearance provided between it and the die chamber wall 102. Such a construction, however, is materially less efficient and practicable than those shown in the accompanying drawings.

As will be seen from these drawings, the disposition of the feed or gathering container 30 and the die 14 in a vertical or horizontal posture is in no way critical. Usually, however, the two components are, from the nature of their relationship in the functioning of the apparatus 10 disposed at an angle, and most desirably a substantially right angle to each other. Other embodiments are however feasible wherein a continuous feed of insulated metal and preferably insulated wire is passed continuously to a compression chamber wherein the metal and insulation are duly separated under an unremitting pressure.

During the compression stroke of the die extrusion ram and shear 22 the feed ram 70 shown in FIGURES 3, 7 and 8 is in its retracted position remote from the feed port 56. The feeder belts 50 of FIGURE 1 are stopped during this period.

It will be evident in this regard that regardless of the manner in which the insulated metal feed 11 is moved through the container 30, the transmission thereof to the die chamber 16 and the compression and separation of insulation and metal therein can be, and normally is, accomplished in a continuous and synchronized manner.

During the compression phase in the die 14, the insulation is expressed from the insulated metallic mass in the die chamber 16 through the passage about the face 90 of the ram 22 provided between the recessed margin 116 and the interior wall of the die chamber 16 into the insulation collecting duct 99 formed by the ram and die collecting channels 104 and 106 respectively as shown in FIGURES 1, 3, 4, 5 and 6 or by the ram collecting channel 104 alone as in FIGURE 7, the unmodified die wall surface 102 merely serving as a closure for one side of the channel 104. The insulation is then expressed through the orifice or orifices 110 for subsequent recovery. The metallic component, substantially free of insulation, is compressed by the ram 22 into the converging or constricting end 19 of the die chamber 16 simultaneously to form the compact 17. In its compression phase the ram 22 may advance to, but does not advance beyond, the point of initial convergence in the constricted end 18 of the die chamber.

The compact 17 can, however, be recovered in a variety of ways from the constricted end 19 of the die chamber. As illustrated in FIGURES 1 and 3 of the compact 17 is forced through the metallic compact extrusion orifice 23 by the action of the ram 22 acting on a successive insulated metallic or wire mass received from the collecting or feed container 30; each successive portion of metal compact 17 integrating with the previously processed compact to form the continuous plate or rod 135 shown in FIGURES 1 and 3.

Figure 5:
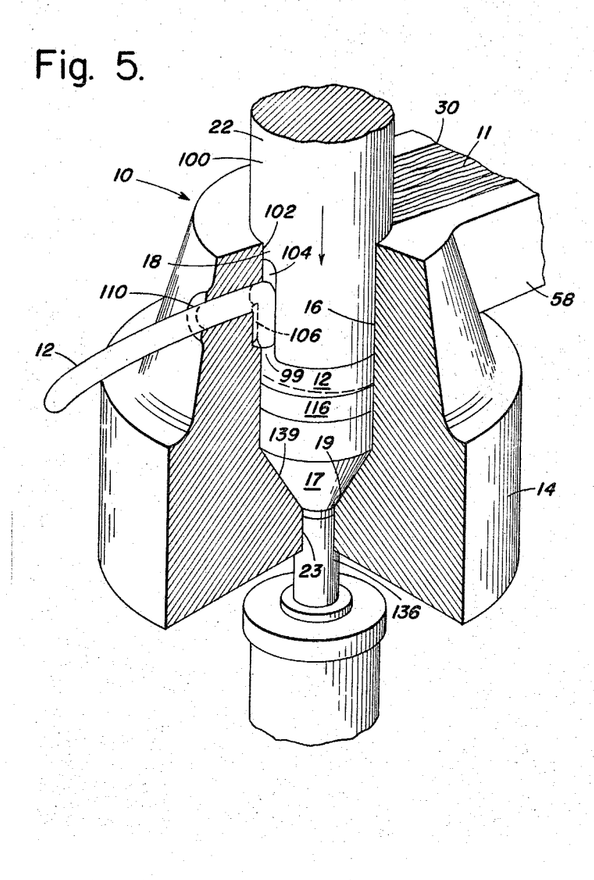
FIGURE 5 is a fragmentary isometric view of a modification of the apparatus and components shown in FIGURE 3 partially in section with portions broken away during compression of a mass of insulated metal.
Figure 6:
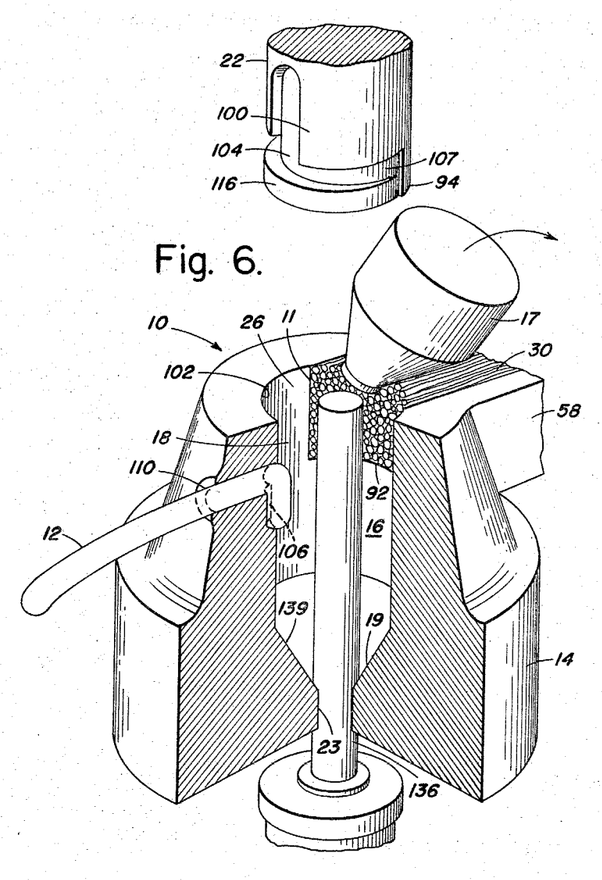
FIGURE 6 is a fragmentary isometric view of the apparatus and components shown in FIGURE 5, partially in section with portions broken away, showing ejection of a metal compact and extrusion of insulation from the apparatus.

A second method of recovering the metal compact 13 is illustrated in FIGURES 5 and 6. In this procedure an ejection probe 136 is extended through the orifice 23 to or adjacent the die chamber 16 prior to the compression stroke of the ram 22. The probe 136 is in fitted slideable engagement with the inner circumference of the orifice 23. The force exerted on the probe 136 is sufficient to maintain it in position in the orifice 23 against the opposed pressure exerted on the compact 17 by the ram 22. After withdrawal of the ram 22 at completion of several compression strokes or in concert with such withdrawal, the probe 136 which may be hydraulically motivated, is passed into the die chamber 16 causing the compact 17 formed in the constricted end of the die 14 and built up by successive shear and compression strokes of the ram 22 to be ejected from the expanded end 26 of the chamber through which the ram 22 enters and leaves the die chamber.

This procedure involves an added step and is thus a two-cycle process. The compacts 17 are formed intermittently rather than continuously as in the other illustrative embodiments shown in the accompanying drawings. Furthermore, since the compact 17 is not compressed for extrusion through the compact extrusion orifice 23 its purity, while very high, e.g. 99.6 percent of metal by weight, is not ordinarily that of metal which has been extruded through the orifice 23. Thus extruded metal 135 attains a metal content by weight of 99.8 percent and even 99.9 percent or higher. The difference in purity attained can be significant in certain instances depending on the use to which the recovered metal is to be applied. The cost incurred employing the probe ejection method of FIGURES 5 and 6 is, however, less than that involved where extrusion is effected. The constriction in the die chamber 16 at the end adjacent the extrusion or probe transmitting orifice 23 is still necessary in this latter embodiment since obturation of the die chamber 16 is still required and such obturation makes unnecessary the use of a probe 136 of large cross-sectional area.

A further modification for effecting recovery of the compact 130 from the constricted end 18 of the die chamber is illustrated in FIGURES 7 and 8 wherein the compact 17 is actually formed and recovered in a manner similar to that of the embodiments of FIGURES 1, 2, 3 and 4. The compact 17 is forced through the compact extrusion orifice 23 which is rectangular in conformation as shown in FIGURE 1, but the wall forming at least one of the converging surfaces 139 of the constricted end 19 of the die chamber is formed of a resilient material such as flexible spring steel to provide a leaf or spring 140. This leaf is attached to the inner surface of the die 14 at a point in the expanded portion 18 of the chamber adjacent the converging segment thereof. The leaf is so arranged as to be spring biased outwardly from the die chamber 16. The posture of the leaf 140 determines the degree of convergence in the constricted end 19 of the die chamber 16 and the cross-sectional dimensions of the metal compact extrusion orifice 23. An inflexible reinforcing plate 142 is arranged exterior to the leaf 140 on the surface of the die 14. The plate 142 is rotatably mounted at one end of the die 14 at that point where the expanded portion of the die chamber 16 meets the converging or constricted end 19. The positions of the plate 142 and of the leaf 140 are determined by rotation of the adjustable wheel 148 bearing the axial hub 150 which is supported in threaded engagement by the cross-beam 152. This latter member is attached in turn to the extended die side walls 153. The end of the hub 150 remote from the wheel 148 impresses against plate 142 which is biased against the hub by the leaf spring 140. The plate 140 thus provides the initial resistance with the converging surface 139 of the opposed side wall 102 to the insulated metal mass as it is forced toward the compact extruding orifice 23. The arrangement of leaf 140, plate 142 and the retention means controlling the lateral movement of the leaf and plate and composed of the wheel 148 and hub 150 must therefore be sufficiently strong to resist the pressure exerted by the extrusion ram 22.

The apparatus of FIGURES 7 and 8 provides in this manner a method for varying the starting resistance and extrusion ratio in the die chamber. As indicated, the metal compact is otherwise formed and evtruded and the insulation separated and recovered in this embodiment by the same technique practiced with the embodiments of FIGURES 1, 2, 3 and 4.

When starting up the process of the invention, a back pressure must be developed in the die chamber 16 necessitating ordinarily the initial insertion of bare wire or a slug composed exclusively of metal or highly compressed insulation material into the die chamber 16. This step is obviated by the variable extrusion opening at the constricted end 19 of the die provided by the leaf spring 140, the plate 142 and the control wheel 148 and hub 150. This modification permits a wide variation in the extrusion ratio, that is the ratio of the enlarged cross-sectional area at the expanded entry end 18 of the die chamber 16 to the cross-sectional area at the constricted end 19 and in the orifice 23.

Accordingly, this embodiment provides, as noted above, for ready imposition of a high starting pressure e.g. 20,000 to 60,000 pounds per square inch by narrowing of the extrusion orifice 23. This apparatus also provides a variable control of the metal density of the compact being extruded by variation of the amount of insulation permitted to remain therein. It further provides a variable die resistance for processing many types and hardnesses of metals such, for example, as copper, aluminum, zinc, tin, silver and even copper or aluminum clad steel wire, parts and the like. These metals are of course also processed according to the invention in the illustrative embodiments of FIGURES 1 to 6 as well.

Variable extrusion can be effected automatically. It can, illustratively, be controlled by hydraulic pressure build-up which is a function of the deformation and fractional resistance within the die 14.

The metal recovered in accordance with the invention is capable of re-use without involved preparatory smelting or refining processes. For example, scraps copper wire separated from its insulation can be converted to an electro-refined state simply by treatment in a refining anode casting furnace. The recovered metal can also be employed directly in the metal, and particularly, the brass, copper and aluminum foundry industries, since the extruded metallic compacts of the invention attain a metal content of 99.8 percent by weight and higher.

The recovered insulation is also re-used directly for purposes for which it could be utilized prior to its physical combination with a metal. For example, a tetrafluoroethylene resin, such as Teflon, a very costly material used increasingly in wire insulation, can be recovered without substantial damage to its physical and chemical properties and reused for the same purpose. The process is of value too with less expensive insulation materials in view of its efficiency and economy.

The rate of extrusion, extrusion ratios and the like are dependent on the machinery employed, the nature of the insulated metal being treated and other practical considerations. An unnecessarily rapid rate of extrusion, for example, increases significantly the power consumption of the treating process and increases the temperature present within the die chamber 16 to one which may be undesirable.

The longer the die chamber 16 and the compression stroke of the ram 22, the greater the friction and the resulting back pressure buildup. Similarly, the greater the ratio of the cross-section of the expanded end 18 of the die chamber 16 to that of the constricted end 19 the greater the increase in back pressure, too. Thus, when a long compression stroke is had in a long die chamber 16 the extrusion ratio, that is the ratio of the cross-section of the upper portion 26 of the die chamber to that of the constricted segment 18, need not be as great as when a shorter die chamber and compression stroke are used. For the purposes of this invention, therefore, extrusion ratios of from 7-to-1 to 11-to-1 have been found appropriate for use with most insulated metals treated. Where variable metal extrusion control is had the higher ratio is employed initially and a transition thereafter made to the lower ratio recited, if desired.

A preferred rate of extrusion is about 500 inches of metal per minute. An extrusion rate within the range of 300 to 600 inches per minute is however, desirable, and depending on the material extruded and the dimensions of the equipment employed, a rate at one or the other end of this range may in fact be preferred. An extrusion rate in excess of 600 inches per minute will, however, often cause the insulation to burn and should therefore be avoided.

The desired angle of convergence toward the metal extrusion orifice 23 occurring in the constricted segment 19 of the die chamber will vary with the compression force of the ram 22, the size of the die chamber 16, the dimensions and kind of insulated metal being treated, the length of the compression stroke of the ram 22 within the die chamber 16 and the like. However, generally, a suitable angle of convergence is between 70° and 120°.

The pressures employed in the die chamber 16 are usually within the range of 20,000 to 60,000 pounds per square inch p.s.i.) when the ram 22 is fully compressed within the die chamber 16. Suitable pressures will, however, vary with the particular material being treated and whether the metal is extruded through the orifice 23 or probe 136 ejected from the die chamber 16.

The higher pressures, those from 40,000 p.s.i., and normally from 50,000 p.s.i. to 60,000 p.s.i., and particularly the later, are preferred since they assure more effective separation of metal from insulation whether by extrusion or ejection from die chamber 16 with the probe 136. Operation at the foregoing pressures usually obviates concern that the pressure employed will cause physical or chemical degradation of the insulation which it is sought to recover. This degradation caused by combustion tends to occur at higher pressures.

Extruded metal compacts, for example, copper, secured by the instant process at pressures within the range of 30,000 p.s.i. to 60,000 p.s.i. have a purity of from 98 percent to 99.95 percent by weight and contain a residue of insulation of from 0.05 percent to 2.0 percent, respectively. At the upper end of the pressure range, i.e., 50,000 p.s.i. to 60,000 p.s.i., the purity of the metal is from 99.8 percent to 99.95 percent usually. A pressure of 20,000 p.s.i. is sufficient however to produce a metal having a purity of 87 percent or more which is suitable, for example, where compacted copper wire is recovered, for use as scrap in a copper smelter.

The minimum pressure for economic commercial operation should be in excess of the yield point of the metal which at the operating temperatures employed herein is about 30,000 p.s.i. to 31,000 p.s.i. Pressures are measured as the total pressure applied by the ram 22 divided by the cross-sectional area of the ram or die chamber 16.

The foregoing pressures are also employed in probe ejection recovery procedures such as are shown in the embodiments of FIGURES 5 and 6.

As indicated, probe ejected metal compacts do not attain the purity of extruded metal compacts. Even at the optimum pressure range of 50,000 p.s.i. to 60,000 p.s.i. they usually evidence a purity of about 99.6 percent by weight, although greater purity can be, and frequently is, secured. Metal of this purity is of refinery grade and therefore of material value. In any event, whether ejected or extruded the recovered metal usually has a purity of not less than 87 percent as indicated above.

The present invention is particularly applicable to the removal of insulation from wire, whether one or a plurality of insulated wires are treated simultaneously. Where the metal compact extruded or probe ejected is formed from wire the individual strands are interfaced to form an interlocking network of compressed or compacted wire. Insulated wire usually contains about 50 percent of copper. An illustrative insulated metal for treatment herein contains 47 percent by weight of insulation with a density of 1.1 grams (g.) per cubic centimeter (cc.) and 53 percent by weight of copper with a density of 8.9 g./cc. The invention is also applicable to the removal of insulation from copper or aluminum wire or copper wire having tin surfaces, as well as from composite electrical components including ballast boxes and specifically those having an iron core, insulated material including armored cable, shielded cable, plugs and the like. Where the charge to the die chamber contains a large proportion of ferrous materials, and the higher extrusion pressures are required, insulated cooper wire may be desirably mixed with the ferrous containing charge.

The grain structure of the recovered metal is such, whether formed from wire or metal parts, that although unfused, the metal is nevertheless so mechanically compacted as to provide a cohesive mass of good conductivity that can be sawed or milled without rupture. Where the recovered metal compact is of a purity of about 99.8 percent or higher and properly shaped, it can be used directly as an anode in refining operations.

To impart the necessary degree of viscosity to the insulation to be extruded in the die chamber 16 and through the insulation duct 99 and orifice 110, the temperature in this chamber should be above the softening point of the insulation at the pressure employed and below that at which burning or degradation of the physical and chemical properties of the insulation occur. The operative temperature range will therefore vary with the material. For most materials, however, a temperature within the range of 325° F. and 375° F. has been found to be preferred while temperatures within the range of 200° F. to 400° F. have been found to be satisfactory generally. With specific materials, such as for example, polyethylene or cellulose acetate, temperatures as low as 140° F. are operative; while temperatures in excess of 400° F. are suitable where polytetrafluoroethylene (Teflon, a trade name) is being extruded for recovery. Where the insulation is formed from a thermoplastic resin, this material is extruded from the die chamber as a semi-viscous, self-adhering continuous plastic flow and can be cast directly as soon as it is extruded. Thermosetting resins employed as insulation do not normally manifest a well defined softening point. Within the foregoing temperature ranges, they are removed if previously cured, in discrete form suitable for use as filler material. Inorganic materials, such as asbestos, fiberglas, mica and the like are removed in a similar manner. If not cured, the thermoset resins are extruded in like fashion to the thermoplastic resins. The thermosetting resins or inorganic materials used as insulation materials occurring in admixture with thermoplastic resins are conveniently removed at a temperature which is most appropriate for extrusion of the latter component. This is particularly true where the mixture of thermoplastic and thermosetting insulating materials charged to the die chamber contain at least 20 percent and preferably about 50 percent of thermoplastic material. The thermoplastic materials appear to serve as sources and vehicles for removal of the thermoset and inorganic insulating materials from the die chamber.

It is also feasible to recover thermoplastic resins employed as insulation in reusable form from segregated scrap material containing not only one but a plurality of compatible plastic insulation materials.

The insulated metal is usually preheated in the feed container 30 as described above. The temperature of the preheated charge to the die chamber 16 is at least 125° F. normally, and preferably within the range of 200° F. to 250° F. The additional heat ordinarily preferred in the die chamber 16, i.e. at least 325° F., is secured as a result of the friction and pressure exerted therein. The lower the pressure or rate of compression effected within the die 14 the higher the preheating temperature should be and vice versa. It is also possible to introduce an initially cold charge into the die chamber and supply additional heat from or through the die wall 102 as shown in FIGURE 1 and described above. This latter method is less efficient, however. A combination of the foregoing methods can also be undertaken, if desired.

Illustrative thermoplastic resins constituting insulation materials which are recovered according to the invention are polyvinyl chloride and high polyvinyl chloride copolymers, polyvinyl dichloride, polyvinylidene chloride, cellulose acetate and other cellulose esters, chlorinated polyethers, polyethylene, polypropylene, polystyrene, polyfluoroethylenes including polytetrafluoroethylene, poilyamides, acrylic acid esters and the like.

Illustrative of the thermosetting resins recovered are the natural and synthetic rubbers, phenolic resins including polyphenolformaldehyde (Bakelite, a trade name), melamines, urea-formaldehyde resins and the like.

In addition to such inorganic materials as asbestos, Fiberglas, mica and the like, suitable inorganic insulation materials also include such natural organic components as cotton fibers and, of course, synthetic organic materials in fibrous form such as nylon and polyester fibers, for example, Dacron.

It may prove desirable on occasion to place a filter across the face of the insulation extrusion orifice 100 to effect removal of traces of the metallic wire component from the extruded insulation. The choice of the filter mesh size will of course depend on the particular material being treated and on the flow rate engendered within the die chamber 16 by the ram 22. The extrusion pressure on the insulated metal within the die chamber 16 can be increased where such a filter is employed but it is not necessary to do so ordinarily. This safeguard can also be provided if the last portion of each charge of wire contains metal having a minimum dimension larger than the maximum dimension of the clearance about the terminal margin 116 of the ram defining passage into the date duct 99.

It is possible in the practice of my invention to omit the feed container 30 in which preliminary heating and baling or concentration of the insulated metal occurs. In this event the insulated metal is fed directly into the die chamber 16. The direct insertion into the die 14 of the insulated metal without preheating thereof is normally undesirable, however, and the container 30 with the associated ram 70 or endless belts 50 contribute significantly to the effective utilization of the die 14 and extrusion ram 22.

In place of the combined die extrusion ram and shear 22, separate shear and ram elements can be used, the shear being interposed along the course of the feed container or chamber 30. The shear in this embodiment precuts a suitable amount of insulated wire feed, for example, which is then forced into the die 14 and compacted by a die extrusion ram. This modification is, however, elaborate and requires coordination of an increased number of moving parts.

The cross-sectional conformation of the die chamber 16 may vary as seen in the accompanying drawings and described above. A die chamber 16 and ram 22 operating in conjunction therewith of substantially circular cross-section as seen particularly in FIGURES 3 and 4 are normally preferred, however, due to their economy of press size. For particular purposes, however, as where the recovered metal compact is used directly to provide sheet anodes, a rectangular configuration is preferred. Too, since the ram 22 extends within the die chamber 16 only to or adjacent the constricted end 19 the expanded (18) and contracted (19) ends can have different cross-sectional configurations.

Dies can also be had in which the metal extrusion orifice 23 is canted from the axis of applied pressure within the die chamber 16 to render the apparatus 10 more compact.

The following example is further illustrative of the invention.

EXAMPLE

A sample of mixed wire estimated to contain about 67 percent by weight of insulation and 33 percent by weight of copper was placed in a die chamber 16 closed at its constricted end in the manner of FIGURE 4. The die chamber 16 was then heated to about 350° F. as measured by a surface pyrometer. After a few minutes a press or die extrusion ram 22, the face 90 of which had a diameter of ⅞ inch, was driven into the expanded end 18 of the die chamber 16 and the charge of heated insulated wire compressed. The pressure exerted at the limit of the compression stroke of the ram 22 was 20,000 pounds per square inch. Softened insulation was extruded from the evolving metal compact about the face 90 of the ram surface through the clearance provided between the wall of the die chamber 102 and the side wall of the ram 100. The resulting compact of copper which was not extruded was found to contain about .05 percent of contaminants in the form of residual insulation. The purity of the recovered copper was therefore 99.95 percent. The recovered insulation was in turn substantially free of copper.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A process for treating a mass of insulated metal to separate the insulation and metal components which comprises heating the mass to a temperature sufficient to soften the insulation without causing its combustion and compressing the heated mass to extrude the insulation therefrom while compacting the metal component.

2. A process for treating a mass of insulated wire to separate and recover the insulation and metal components which comprises heating the wire mass to a temperature sufficient to soften the insulation and below that required to effect burning thereof and compressing the heated mass to extrude the insulation therefrom while compacting the metal component to effect extrusion thereof.

3. A process for treating a mass of insulated metal to separate and permit recovery of the insulation and metal components which comprises preheating said mass to a temperature below that required to soften the insulation component of said mass and above room temperature, compressing said heated mass in a die chamber at a pressure sufficient (1) to heat said mass to a temperature adequate to soften said insulation and below that required to cause physical and chemical degradation of said insulation and (2) to compress said mass effecting extrusion of said insulation therefrom while compacting the metal component.

4. Process as claimed in claim 3 wherein said mass is preheated to a temperature of at least 140° F.

5. Process as claimed in claim 3 wherein said pressure is at least 20,000 pounds per square inch.

6. A process for treating a mass of insulated metal to separate and permit recovery of the insulation and metal components which comprises heating the mass to a temperature sufficient to soften the insulation and below that required to effect burning thereof and compressing the heated mass in a die to extrude the insulation therefrom while compacting the metal component and causing the extrusion of previously compacted metal present within said die.

7. A process for treating a mass of insulated metal to separate and permit recovery of hte insulation and metal components which comprises preheating said mass to a temperature below that required to soften the insulation component of said mass and above room temperature, compressing said heated mass in a die chamber at a pressure sufficient (1) to heat said mass to a temperature adequate to soften said insulation and below that required to cause physical and chemical degradation of said insulation and (2) to compress said mass effecting extrusion of said insulation from said die chamber and compacting the metal component to cause the extrusion of previously compacted metal present within said die.

8. Process as claimed in claim 7 wherein said mass is preheated to a temperature within the range of 200° F. to 400° F.

9. Process as claimed in claim 7 wherein said mass is subjected in said die chamber to a pressure of within the range of 20,000 pounds per square inch to 60,000 pounds per square inch.

10. A process for treating a mass of insulated wire to separate and permit recovery of the insulation and metal components which comprises preheating the wire mass to a temperature below that required to soften the insulation component of said mass above room temperature, inserting said heated mass into a die chamber having an entry end of expanded cross-sectional area and an opposite end of constricted cross-sectional area and compressing said mass therein by insertion of a ram through the entry end of said die chamber at a pressure sufficient (1) to heat said mass to a temperature adequate to soften said insulation and below that required to cause combustion thereof, and (2) to compress said mass effecting extrusion of said insulation from said die chamber and to compact the metal component in the constricted end of said chamber causing the extrusion of previously compacted metal within said die.

11. A process for treating a mass of insulated wire to separate and recover the insulation and metal components which comprises preheating the insulated wire mass to a point above room temperature and below that required to soften the insulation component of said mass, inserting said heated mass into a die chamber having an entry end of expanded cross-sectional area and an opposite end of constricted cross-sectional area terminating in an extrusion orifice, the ratio of the cross-sectional area of said entry end to that of the opposite end at its termination in said orifice being at least 7:1 respectively, and compressing said mass in said die chamber by insertion of a ram through the entry end thereof at a pressure sufficient (1) to heat said mass to a temperature adequate to soften said insulation and below that required to cause combustion thereof, and (2) to compress said mass effecting extrusion of said insulation from said die chamber and to compact the metal component in the constricted end of said chamber causing the extrusion of previously compacted metal within said die.

12. Process as claimed in claim 11 wherein the ratio of the cross-sectional area of the expanded entry end of said die chamber to the cross-sectional area of the constricted end of said die chamber at its termination in said orifice is from 7:1 to 11:1.

13. Process as claimed in claim 11 wherein the insulation is extruded about the face of the ram inserted into the die chamber.

14. A process for treating a mass of insulated copper wire to separate and recover the insulation and copper components thereof which comprises preheating the insulated wire mass to a temperature within the range of 140° F. to 250° F., inserting said heated mass into a die chamber having an entry end of expanded cross-sectional area and an opposite end of constricted cross-sectional area terminating in an orifice, the ratio of the expanded cross-sectional area of the entry end to that of the opposite end at its termination in said orifice being within the range of 7:1 to 11:1 respectively, and compressing said mass in said die chamber by insertion of a ram through its entry end at a pressure of at least 20,000 pounds per square inch to heat said mass to a temperature of from 325° F. to 375° F. and to compress said mass effecting extrusion of said insulation from said die chamber about the ram inserted therein, and to compact the copper in the constricted end of the die chamber.

15. Process of claim 14 wherein the copper compacted in the constricted end of the die chamber is sequentially extruded therefrom through said orifice.

16. Process as claimed in claim 14 wherein said pressure is within the range of 20,000 to 60,000 pounds per square inch.

17. Process as claimed in claim 14 wherein said pressure is within the range of 50,000 to 60,000 pounds per square inch and extrusion of said insulation occurs during the application of said pressure.

18. Process as claimed in claim 14 wherein said insulation is a member selected from the group consisting of thermoplastic and thermosetting resins and combinations thereof.

19. A process for treating a mass of insulated copper wire to separate and recover the insulation and copper components thereof which comprises preheating the insulated wire mass to a temperature within the range of 200° F. to 250° F., inserting said heated mass into a die chamber having an entry end of expanded cross-sectional area and an opposite end of constricted cross-sectional area terminating in means defining an orifice, the ratio of the expanded cross-sectional area of the entry end to that of the opposite end at its termination in said orifice being within the range of 7:1 to 11:1 respectively, and compressing said mass in said die chamber by insertion of a ram through the entry end at a pressure of from 50,000 pounds per square inch to 60,000 pounds per square inch to heat said mass to a temperature of from 325° F. to 375° F. and to compress said mass effecting extrusion of said insulation from said die chamber about the ram inserted therein and to compact the copper in the constricted end of the die chamber causing the extrusion of compacted copper from said chamber through said orifice, said copper having after extrusion a purity of at least 98 percent by weight.

20. Apparatus for treating a mass of insulated metal to effect separation of the insulation and metal components which comprises a die having defined therein a die chamber adapted to be constricted at one end; a ram to apply pressure to said mass of insulated metal when said mass is in said die chamber; means for extruding said insulation from said die chamber about said ram in a direction substantially opposed to that of the ram in applying pressure to said mass; and means defining an orifice in the constricted end of said die chamber to aid in the removal of said metal component therefrom.

21. Apparatus for treating a mass of insulated metal to effect separation of the insulation and metal components which comprises a die having defined therein a die chamber constricted at one end; a ram to compress said mass of insulated metal when said mass is in said die chamber; cooperating means defined in said ram and die chamber when said ram is compressing said mass to provide passage for extrusion of said insulation from said die chamber about the face of said ram; and means defining an orifice in the constricted end of said die chamber for extrusion of metal therefrom.

22. Apparatus for treating a mass of insulated metal to effect separation of the insulation and metal components which comprises a die having a die chamber in which is defined an entry end of expanded cross-sectional area and an opposite end of constricted cross-sectional area terminating in means defining an orifice; a ram adapted for insertion in said chamber through said entry end to compress said mass of insulated metal disposed in said chamber; cooperating means defined in said ram and die chamber when said ram is compressing said mass to provide passage for the insulation extruded from said die chamber about the face of said ram; and means defining an orifice in the constricted end of said die chamber opposite said ram for extrusion of metal therethrough.

23. Apparatus as claimed in claim 22 wherein the ratio of the cross-sectional area of the expanded entry end to the cross-sectional area of the constricted end of said die chamber at its termination in said orifice is at least 7:1.

24. Apparatus as claimed in claim 22 wherein the ratio of the cross-sectional area of the expanded entry end to the cross-sectional area of the constricted end of said die chamber at its termination in said orifice is within the range of 7:1 to 11:1.

25. Apparatus as claimed in claim 22 wherein heating means are disposed within said die to heat said mass to a temperature above the softening point of the insulation component and below that temperature required for burning thereof.

26. Apparatus for treating a mass of insulated metal to effect separation of the insulation and metal components which comprises a die having a die chamber in which is defined an entry end of expanded cross-sectional area and an opposite end of constricted cross-sectional area; a feed container disposed adjacent the entry end of said die chamber for gathering a mass of insulated metal and feeding said insulated metal mass to said die chamber; a combined shear and ram adapted for insertion into said die chamber through said entry end to sever an insulated metal mass fed to said die chamber from that remaining in said feed container and to compress the mass fed to said chamber in the constricted end thereof; cooperating means defined in said ram and die chamber when said ram is compressing said mass to provide a passage for extrusion of said insulation from said die chamber about the face of said ram; and means defining an orifice in the constricted end of said die chamber opposite the end of said ram to facilitate removal of the metal component therefrom.

27. Apparatus as claimed in claim 26 wherein a probe is disposed in said orifice; said probe being adapted for insertion into said die chamber upon removal of the combined ram and shear therefrom to force the compressed metal component from said die chamber through the entry end thereof.

28. Apparatus as claimed in claim 26 wherein the means defining an orifice in the constricted end of said die chamber is adapted to adjust the cross-sectional area of the constricted end of said die chamber and of the orifice disposed therein.

29. Apparatus as claimed in claim 28 wherein said means defining the orifice in the constricted end of said container is adapted to adjust the cross-sectional area of the constricted end of said die chamber and said orifice.

30. Apparatus for treating a mass of insulated metal to effect separation of the insulation and metal components which comprises a die having a die chamber in which is defined an entry end of expanded cross-sectional area and an opposite end of constricted cross-sectional area; the ratio of said cross-sectional areas to one another being within the range of 7:1 to 11:1 respectively; a feed container adjacent the entry end of said die chamber for collecting a mass of insulated metal; means for forcing said collected mass from said container into said die chamber, and heating means disposed in said feed container for raising the temperature thereof to a level above room temperature and below that of the softening point of the insulation in said mass; a combined shear and ram adapted for insertion into said die chamber in frictional slideable engagement therewith to sever an insulated mass fed to said die chamber from that remaining in said feed container and to compress the mass fed to said die chamber in the constricted end thereof; cooperating means defined in said ram and die chamber to provide a passage and orifice for extrusion of said insulation from said die chamber about the face of said combined shear and ram when said ram is compressing said mass; and means defining a second orifice in the constricted end of said die chamber opposite the end of said ram to facilitate removal of the metal component therefrom.

References Cited

UNITED STATES PATENTS

| | | | |
|---|---|---|---|
| 1,473,610 | 11/1923 | Day | 75—47 |
| 1,533,563 | 4/1925 | Maggi | 264—36 |
| 2,346,228 | 4/1944 | Merrill et al. | 134—5 |
| 2,391,752 | 12/1945 | Stern | 29—403 |
| 2,432,868 | 12/1947 | Earl et al. | 134—19 |
| 2,676,882 | 4/1954 | Hatch | 29—403 |
| 2,882,188 | 4/1959 | Levin et al. | 134—9 |

FOREIGN PATENTS 571,875   9/1945   Great Britain.

MORRIS O. WOLK, *Primary Examiner.*

G. R. MYERS, *Assistant Examiner.*